United States Patent [19]
Seki et al.

[11] Patent Number: 4,979,128
[45] Date of Patent: Dec. 18, 1990

[54] METHOD OF DECIDING ROBOT LAYOUT

[75] Inventors: Masaki Seki, Tokyo; Haruhiko Tatsumi, Kanagawa, both of Japan

[73] Assignee: Fanuc Ltd., Minamitsuru, Japan

[21] Appl. No.: 309,663

[22] PCT Filed: Jun. 29, 1988

[86] PCT No.: PCT/JP88/00650
§ 371 Date: Feb. 8, 1989
§ 102(e) Date: Feb. 8, 1989

[87] PCT Pub. No.: WO89/00094
PCT Pub. Date: Jan. 12, 1989

[30] Foreign Application Priority Data
Jun. 29, 1987 [JP] Japan .................................. 62-161987

[51] Int. Cl.$^5$ ............................................. G05B 19/42
[52] U.S. Cl. ................................. 364/513; 364/474.26
[58] Field of Search ....................... 364/474.19, 474.20, 364/474.26, 184, 185, 513; 318/563, 565, 568.1, 568.25

[56] References Cited
U.S. PATENT DOCUMENTS

| | | | |
|---|---|---|---|
| 4,571,670 | 2/1986 | Kishi et al. | 364/474.26 |
| 4,633,409 | 12/1986 | Sekikawa | 364/474.20 |
| 4,734,845 | 3/1988 | Kawamura et al. | 364/474.26 |
| 4,831,548 | 5/1989 | Matoba et al. | 364/513 |

FOREIGN PATENT DOCUMENTS

| | | | |
|---|---|---|---|
| 0195613 | 10/1985 | Japan | 318/368.25 |
| 61203251 | 9/1986 | Japan | 364/474.26 |

OTHER PUBLICATIONS

"Robot Task Planning System Based on Product Modelling", Kawabe et al., IEEE 1985 Compint-Computer Aided Technologies, Montreal, Canada, 9/85, pp. 471-476.
"A Computer-Aided Manipulation System for a Multi--Joint Inspection Robot", Tsuchihashi et al., 1985 Conference on Advanced Robotics, pp. 363-369.
"Robot Simulator in TIPS/Geometric Simulation", Okino et al., Robotics & Computer-Integrated Manufacturing, vol. 3, No. 4, pp. 429-437, 1907.

Primary Examiner—Allen R. MacDonald
Attorney, Agent, or Firm—Staas & Halsey

[57] ABSTRACT

In a method of deciding robot layout according to the present invention, the origin ($P_i$) of a robot layout is entered, the range (1) of robot motion at the origin of robot layout is displayed, obstacles (2, 3) within this range of motion are displayed in a color different from that of obstacles outside the range of robot motion, and the origin of robot layout is decided, while reference is made to the display, in such a manner that the robot will not interfere with the obstacles and will be capable of performing motions with respect to a workpiece.

10 Claims, 5 Drawing Sheets

METHOD OF DECIDING ROBOT LAYOUT

FIELD OF THE INVENTION

This invention relates to a method of deciding a robot layout. More particularly, the invention relates to such method in which the range of motion of a robot is displayed and the layout of the robot is decided upon investigating interference with obstacles and whether the robot can perform an operation with respect to a workpiece.

DESCRIPTION OF THE PRIOR ART

In a case where parts at a work station are to be handled by a robot, path data for moving the robot to any point along any path and data stipulating robot motions are required to be fed into a robot controller. To this end, the usual practice is to create a robot control program by manipulating a teach pendant to actually move the robot and teach the coordinates of necessary points, motion speeds up to these points, type of movement which is indicative of linear movement or circular movement, and robot service codes at the abovementioned points. The robot control program is input to the robot controller so that the robot may be controlled.

However, this method of creating a robot control program is troublesome in terms of the teaching operation. For this reason, a method has been proposed in which a robot control program is created by an offline programming operation.

In offline programming, motion of a robot is defined using simple robot language and variables (e.g., each point is expressed in the form of a position variable $P_i$), and a source program created in the robot language is translated by the translating function of an offline programming apparatus to create two files, namely (1) a motion file expressed in the form of predetermined codes executable by the robot controller, and (2) a variable file indicating variables used in the motion file, and these variables are subsequently specified by a keyboard or other means.

In accordance with this offline programming method, a source program for robot control can be readily created if only simple robot language is known, and merely entering the source program makes it possible for the offline programming apparatus to subsequently create the motion file, which comprises the predetermined codes executable by the robot controller, and the variable file.

In a case where the layout of the robot is studied after the layout of the work station, etc., has been decided, the fact that the conventional offline programming apparatus does not possess a function for displaying the range of robot motion makes it necessary for the applications designer to draw the range of robot motion at his desk, check for interference between the robot and structures at the work station and interference between the robot and other obstacles and then, upon reviewing placement, input the robot placement position to the offline programming apparatus. This is a very troublesome task.

SUMMARY OF THE INVENTION

Accordingly, an object of the present invention is to provide a method of deciding robot layout in which range of robot motion, work station structures and other obstacles are displayed simultaneously on a display screen using an offline programming apparatus so that it is easy to perform a review operation for investigating whether the robot and obstacles will interfere and a review operation for investigating whether the robot can perform motions with respect to a workpiece, thereby making it possible for the robot to be disposed at the correct position.

In a method of deciding robot layout according to the present invention, range of robot motion at an inputted origin of robot layout is displayed, obstacles within this range of motion are displayed in a color different from that of obstacles outside the range of robot motion, and the origin of robot layout is decided, while reference is made to the display, in such a manner that the robot will not interfere with the obstacles and will be capable of performing motions with respect to a workpiece.

DESCRIPTION OF THE PREFERRED EMBODIMENT

Figure 1:
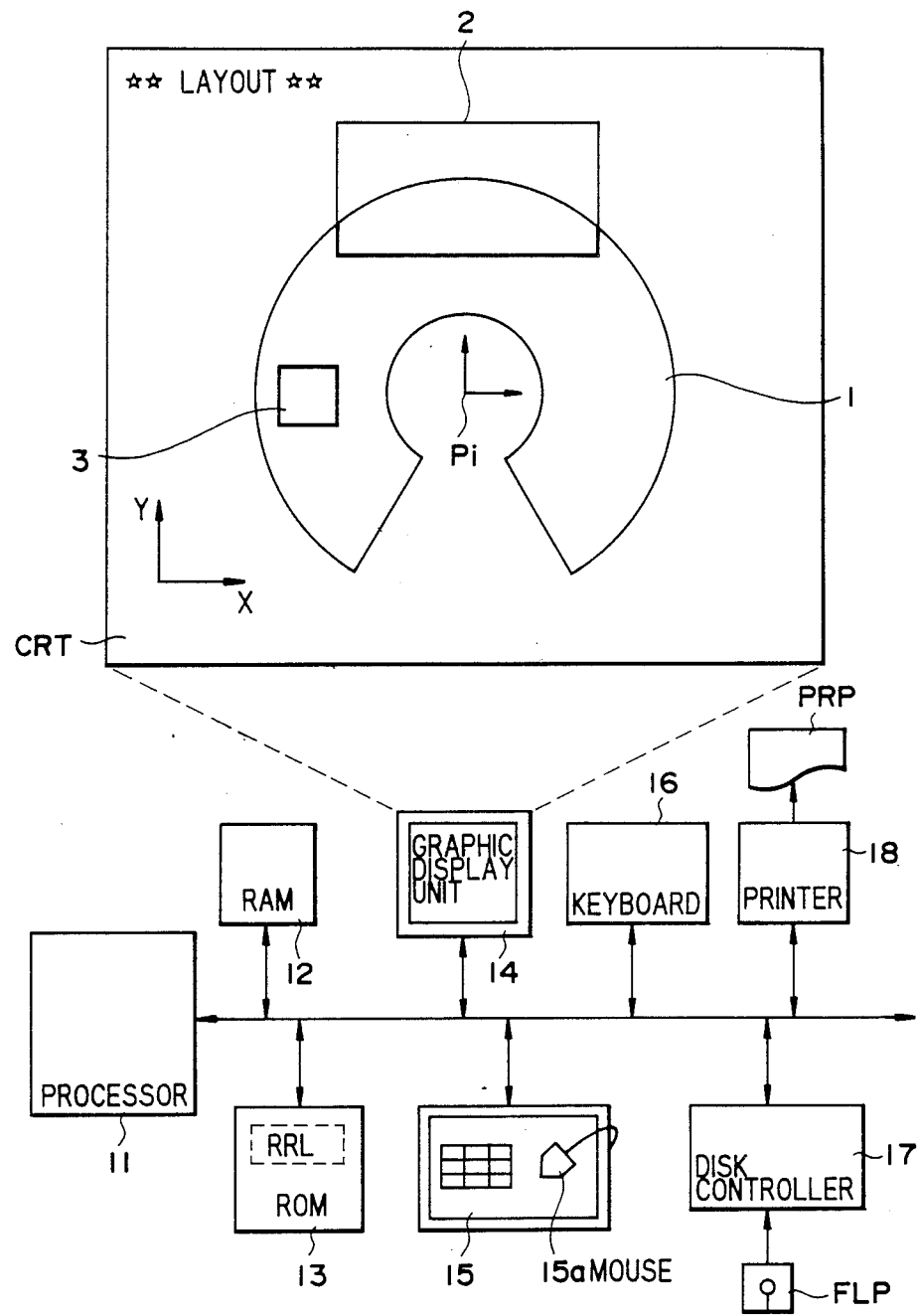
FIG. 1 is a block diagram of an offline programming apparatus for practicing the present invention.

FIG. 1 is a block diagram of an offline programming apparatus for practicing the present invention.

Numeral 11 denotes a processor, 12 a RAM storing the results of processing, 13 a ROM storing a program RRL for deciding robot layout as well as various other programs, 14 a graphic display unit, 15 a tablet device, 16 a data input unit such as a keyboard, 17 a display controller, 18 a printer, FLP a floppy, and PRP a printing paper. A range 1 of robot motion, first and second obstacles 2, 3 which interfere with the robot, and an origin $P_i$ of robot layout are displayed on the CRT screen of the graphic display unit 14.

The tablet 15 has a mouse 15a for moving a graphic cursor to pick a point on the display screen of the CRT and input the position of the robot origin. Also, predetermined items written on a menu chart on the tablet surface are picked by the mouse 15a. In this way various items and data can be entered.

Figure 2:
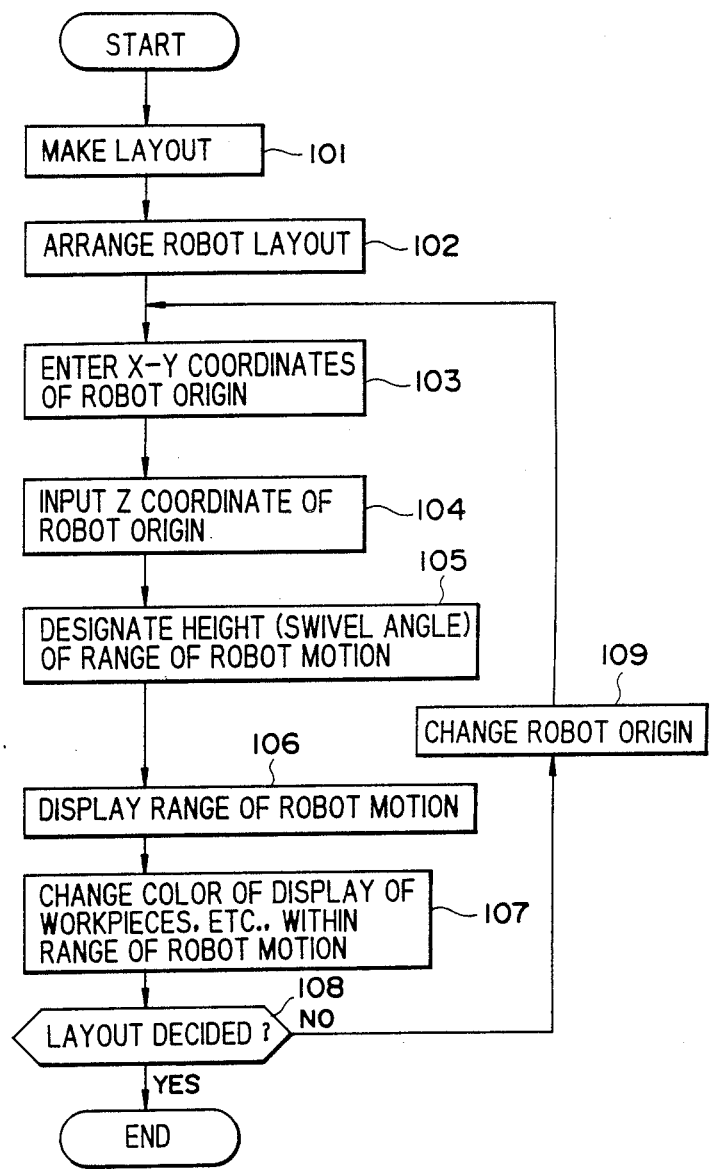
FIG. 2 is a flowchart of processing according to the method of the invention.

FIG. 2 is a flowchart of processing according to the method of the invention. A method of deciding robot layout according to the invention will now be described in accordance with the flowchart of FIG. 2.

Figure 3:
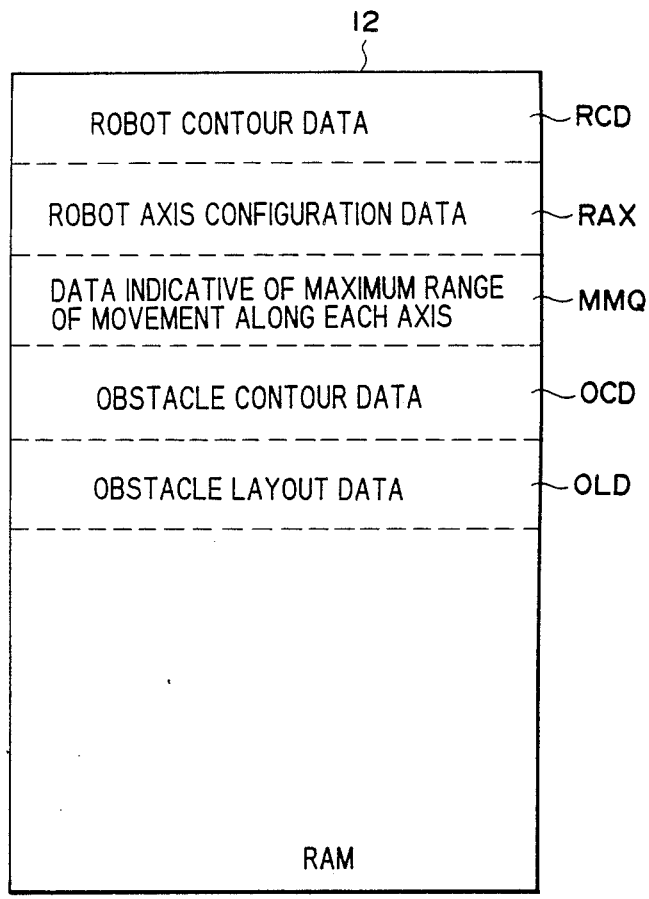
FIG. 3 is a view for describing data stored in a RAM.
Figure 4:
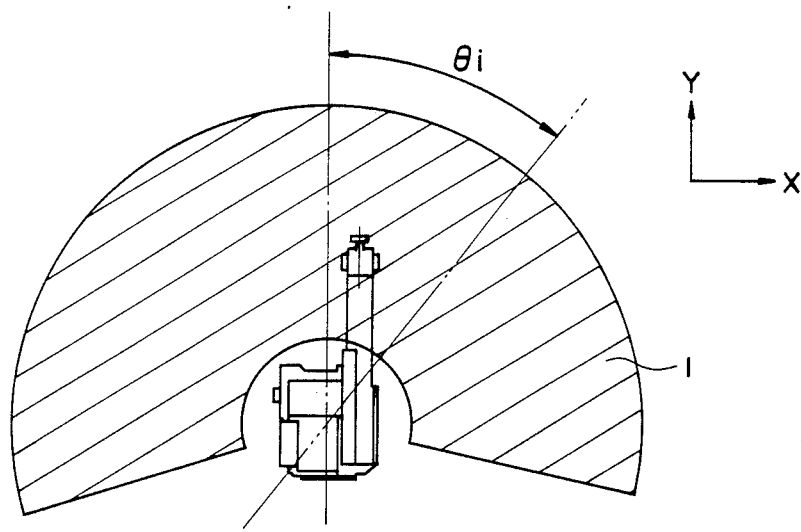
FIGS. 4(a), 4(b) and 5 are views for describing examples of displays in the present invention.
Figure 4:
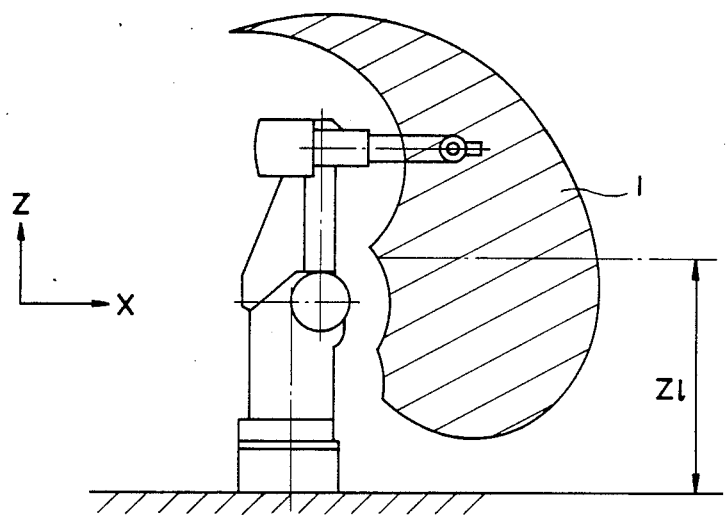

Before processing for deciding robot layout is executed, robot contour data RCD, robot axis configuration data RAX, data MMQ indicative of maximum range of movements along respective axes, and contour data OCD indicative of the contours of the obstacles 2, 3 are entered and stored in the RAM 12 (see FIG. 3), the obstacles are laid out and the data OLD indicative of the layout thereof are also stored in the RAM 12. It is assumed here that the range of three-dimensional motion defines a donut-shaped three-dimensional form. When a projection onto the X-Y coordinate plane is displayed, height $Z_i$ from a reference plane is designated and the donut-shaped three-dimensional form is displayed as a cross section [FIG. 4(a)] thereof at the height $Z_i$. When the projection onto the X-Z coordinate plate is displayed, swivel angle $\theta_i$ of a first axis of the robot is designated, and the donut-shaped three-dimensional form is displayed as a cross section [FIG. 4(b)] thereof at the swivel angle $\theta_i$.

The operator causes the display screen CRT of the offline programming apparatus to display "LAYOUT MENU SCREEN" (step 101) by performing a predetermined operation, and selects "2. ROBOT LAYOUT" (step 102) from the menu items "1. WORKPIECE LAYOUT", "2. ROBOT LAYOUT" . . . and the like. In response, the processor 1 uses the obstacle contour data OCD and the obstacle layout data OLD to display, on the display screen CRT, the contours of the obstacles as well as the following inquiries regarding the robot origin:

| ENTER ROBOT ORIGIN |
| --- |
| X = |
| Y = |
| Z = |

In response to these inquiries, the operator considers the layout of the obstances and designates the X, Y, Z coordinates of the robot origin. Since it is convenient to use the tablet device 15 when inputting the robot origin, the robot origin $P_i$ is picked by the mouse 15a to enter the coordinates of X and Y (step 103), after which the Z coordinate is inputted by operating the keyboard 16 (step 104).

When the robot origin has been entered, the processor 11 causes the display screen CRT to display a prompt inquiring about the height of the range of robot motion. Therefore, the operator responds to the prompt by entering e.g. the height $Z_i$ [see FIG. 4(b)] (step 105).

When the height $Z_i$ has been entered, the processor 11 uses the data MMQ, which indicates the maximum range of movement along each axis, to create display data for displaying the range of robot motion at the abovementioned height, and feeds the display data into the graphic display unit 14. As a result, the graphic display unit 14 displays, in a predetermined color, the range 1 of robot motion (see FIG. 1) at the level of height $Z_i$ on the display screen CRT (step 106). At the same time, the graphic display unit 14 changes to different colors the colors of the contours (the bold lines in FIG. 1) of the first obstacle partially included within the range 1 of robot motion and of the second obstacle 3 the entirety of which is included with the range 1 of robot motion (step 107).

Next, the operator decides whether the designated robot origin is suitable as the origin of a robot layout (step 108). If it is not suitable, the robot origin is changed (step 109), processing from step 103 onward is repeated, the height $Z_i$ is subsequently changed as required and similar processing is executed. If the designated robot origin is suitable as the origin of a robot layout, then processing for deciding the robot layout ends.

Figure 5:
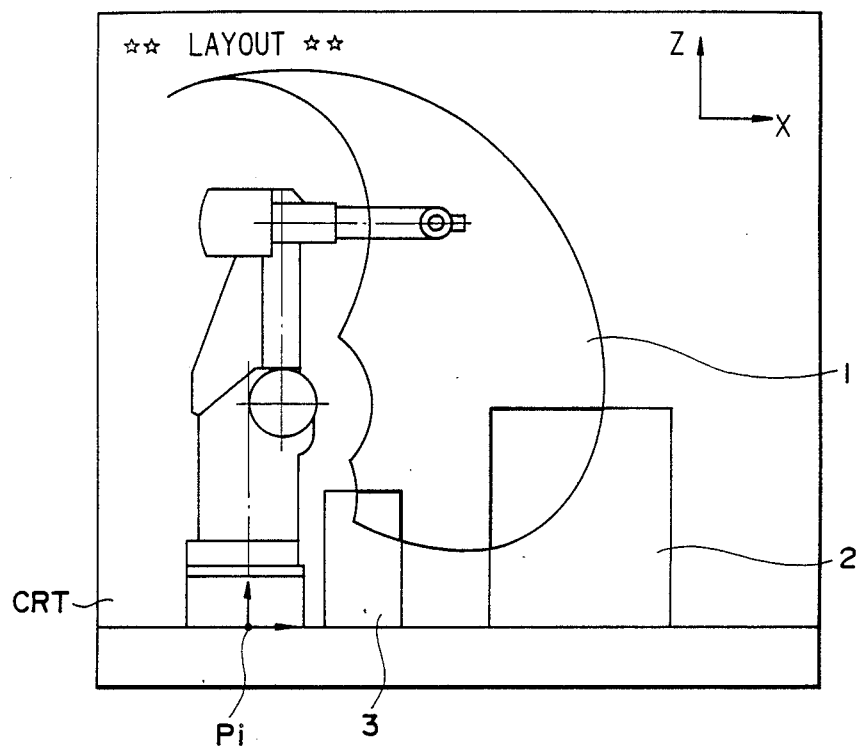

In the foregoing an example is illustrated in which range of robot motion projected onto the X-Y coordinate plane is displayed on the display screen CRT. However, in a case where range robot motion is projected onto the X-Z plane, the swivel angle $\theta_i$ [see FIG. 4(a)] of the first axis of the robot is entered in response to the prompt of step 105, whereupon the processor causes the range 1 of robot motion in the X-Z coordinate plane to be displayed on the CRT (see FIG. 5), after which similar processing for deciding the robot layout is performed.

Though the foregoing is for a case where the contours of obstacles within the range of robot motion are displayed in different colors, another display method is conceivable in which the obstacles within the range of robot motion are painted in different colors.

In accordance with the present invention, the arrangement is such that the range of motion of a robot is displayed and the contours of obstacles within this range of robot motion are displayed in colors different from those of the contours of obstacles outside the range of robot motion. Therefore, it is easy to perform a review operation for investigating whether the robot and obstacles will interfere and a review operation for investigating whether the robot can perform motions with respect to a workpiece, thereby making it possible to decide, simply and correctly, the layout of the robot.

We claim:
1. A method for deciding a robot layout based upon investigating interference between the robot and obstacles, comprising:
 (a) inputting robot axis configuration data, data contour data indicative of the contours of the obstacles and layout data of the obstacles;
 (b) displaying on a display screen, the obstacles based on said contour data and said layout data;
 (c) inputting an origin of robot layout and a designated height from a reference plane;
 (d) determining display data for displaying a maximum range of robot motion using said designated height, said origin of robot layout and said data indicative of maximum range of movements along each robot axis;
 (e) displaying said maximum range of motion using said display data;
 (f) displaying obstacles within said maximum range of motion in color different from that of obstacles outside said maximum range of motion; and
 (g) changing said origin of robot layout to eliminate interference between the robot and the obstacles.

2. A method according to claim 1, wherein step (f) includes the sub-step of:
 displaying contours of the obstacles within said maximum range of motion in different colors than colors of the contours of the obstacles outside said maximum range of motion.

3. A method for deciding a robot layout upon investigating interference between the robot and obstacles, comprising:
 (a) inputting robot axis configuration data, data indicative of maximum range of movements along each robot axis, contour data indicative of the contours of the obstacles and layout data of the obstacles;
 (b) displaying on a display screen, the obstacles based on said contour data and said layout data;
 (c) inputting an origin of robot layout and a designated swivel angle of the robot;
 (d) determining display data for displaying a maximum range of robot motion using said designated swivel angle, said origin of robot layout and said data indicative of maximum range of movements along each robot axis;
 (e) displaying said maximum range of motion using said display data; and
 (f) displaying obstacles within said maximum range of motion in a color different from that of obstacles outside said maximum range of motion.

4. A method according to claim 3, wherein step (f) includes the sub-step of:
   displaying contours of the obstacles within said maximum range of motion in different colors than colors of the contours of the obstacles outside said maximum range of motion.

5. A method for determining an origin of a robot so that motion of the robot is free from obstacles, comprising the steps of:
   (a) inputting obstacle data and maximum range data indicative of a three-dimensional maximum range of robot motion;
   (b) inputting a selected robot origin and at least one of a selected display height and a swivel angle;
   (c) displaying on a display screen the obstacles and a maximum range of robot motion based on at least one of said display height and said swivel angle, and based on said obstacle data, said maximum range data and said selected robot origin; and
   (d) changing said selected robot origin to eliminate interference between the robot and the obstacles.

6. A method as recited in claim 5, further comprising the step of:
   displaying the obstacles on said display screen, based on said obstacle data and before step (b).

7. A method as recited in claim 5, wherein step (c) further comprises the sub-step of:
   displaying portions of obstacles within said displayed maximum range of a robot motion in a visually distinguishable format from portions of obstacles outside said displayed maximum range of robot motion.

8. A method as recited in claim 5, further comprising the step of:
   repeating steps (b) and (c) until said selected robot origin is suitable.

9. An apparatus for determining an origin for a robot so that motion of the robot is free from obstacles, comprising:
   means for inputting and storing obstacle data, maximum range data indicative of a three-dimensional maximum range of robot motion, a selected robot origin, and at least one of a selected display height and a swivel angle;
   means for displaying obstacles and a maximum range of robot motion based on at least one of said display height and said swivel angle, and based on said obstacle data, said maximum range data, and said selected robot origin; and
   means for changing said selected robot origin to eliminate interference between the robot and the obstacles.

10. A apparatus as recited in claim 9, wherein said means for displaying further comprises distinguishing means for displaying portions of obstacles within said displayed maximum range of robot motion in a visually distinguishable format from portions of obstacles outside said displayed maximum range of robot motion.

* * * * *